United States Patent
Ptacek et al.

(10) Patent No.: US 11,035,962 B2
(45) Date of Patent: Jun. 15, 2021

(54) SUPPLEMENTAL SYSTEM FOR A SATELLITE BASED APPROACH DURING LOW VISIBILITY CONDITIONS

(71) Applicant: Honeywell International s.r.o., Chodov (CZ)

(72) Inventors: Pavel Ptacek, Rosice (CZ); Mats Anders Brenner, Plymouth, MN (US); Tomas Beda, Prague (CZ)

(73) Assignee: Honeywell International s.r.o., Chodov (CZ)

(*) Notice: Subject to any disclaimer, the term of this patent is extended or adjusted under 35 U.S.C. 154(b) by 311 days.

(21) Appl. No.: 16/127,994

(22) Filed: Sep. 11, 2018

(65) Prior Publication Data

US 2020/0081137 A1    Mar. 12, 2020

(51) Int. Cl.
*G01S 19/48* (2010.01)
*G01S 19/15* (2010.01)
*G01S 19/40* (2010.01)
*G01S 19/45* (2010.01)

(52) U.S. Cl.
CPC .......... *G01S 19/48* (2013.01); *G01S 19/15* (2013.01); *G01S 19/40* (2013.01); *G01S 19/45* (2013.01)

(58) Field of Classification Search
CPC .......... G01S 19/48; G01S 19/15; G01S 19/40; G01S 19/45
USPC .......... 342/357.31, 357.23, 357.28, 357.53
See application file for complete search history.

(56) References Cited

U.S. PATENT DOCUMENTS

| | | | |
|---|---|---|---|
| 6,281,836 B1* | 8/2001 | Lupash | G01C 21/24 342/357.58 |
| 6,798,377 B1 | 9/2004 | Lupash et al. | |
| 6,809,684 B2* | 10/2004 | Brenner | G01S 19/15 342/357.27 |
| 6,847,893 B1* | 1/2005 | Lupash | G01S 19/20 340/970 |
| 7,579,978 B1* | 8/2009 | Finley | G01S 7/412 342/33 |

(Continued)

OTHER PUBLICATIONS

European Patent Office, "Extended European Search Report from EP Application No. 19195759.6", from Foreign Counterpart to U.S. Appl. No. 16/127,994, dated Feb. 7, 2020, pp. 1-7, Published: EP.

*Primary Examiner* — Chuong P Nguyen
(74) *Attorney, Agent, or Firm* — Fogg & Powers LLC

(57) ABSTRACT

A method of supplementing a satellite based augmentation system approach during low visibility conditions is provided. The method includes acquiring satellite range measurements and additional measurements from at least one additional onboard independent sensor. Core sigma values are assigned for satellite range measurements and for each additional measurement from the at least one additional onboard independent sensor. A weighted position solution is determined using the acquired satellite range measurements, the acquired additional measurements and the assigned core sigma values. A discriminator is applied that utilizes vehicle positions derived from the acquired satellite range measurements and from the additional measurements to determine if a fault is present in the weighted position solution. An alert is generated if an output of the discriminator is outside a set tolerance value needed for low visibility operation.

17 Claims, 4 Drawing Sheets

(56) References Cited

U.S. PATENT DOCUMENTS

| | | |
|---|---|---|
| 8,019,539 B2 * | 9/2011 | Vanderwerf ............ G01S 19/20 |
| | | 701/471 |
| 8,160,758 B2 | 4/2012 | Call et al. |
| 8,321,074 B1 | 11/2012 | Bell et al. |
| 8,494,693 B2 | 7/2013 | Murphy |
| 8,498,758 B1 | 7/2013 | Bell et al. |
| 8,566,033 B2 * | 10/2013 | Clemenceau ........... G01S 19/48 |
| | | 701/469 |
| 8,629,805 B2 * | 1/2014 | Pulford .................. G01S 19/20 |
| | | 342/357.58 |
| 8,928,527 B2 | 1/2015 | He et al. |
| 9,031,785 B2 * | 5/2015 | Marcon ................ G01C 21/165 |
| | | 701/469 |
| 9,165,366 B2 | 10/2015 | Koukol et al. |
| 9,222,799 B1 | 12/2015 | Bell et al. |
| 9,453,921 B1 | 9/2016 | Bell et al. |
| 9,547,086 B2 * | 1/2017 | Dunik .................... G01S 19/20 |
| 10,197,678 B1 * | 2/2019 | Wang ...................... G01S 19/20 |
| 10,247,573 B1 * | 4/2019 | Gavrilets ............... B64D 47/08 |
| 10,422,872 B2 * | 9/2019 | Dunik .................... G01S 13/08 |
| 10,459,085 B1 * | 10/2019 | Bell ........................ G01S 19/40 |
| 2009/0182493 A1 * | 7/2009 | McDonald ............. G01S 19/52 |
| | | 701/532 |
| 2014/0229100 A1 | 8/2014 | Marcon |
| 2014/0292574 A1 | 10/2014 | Dunik et al. |
| 2017/0350973 A1 * | 12/2017 | Dunik .................... G01S 19/45 |

* cited by examiner

SUPPLEMENTAL SYSTEM FOR A SATELLITE BASED APPROACH DURING LOW VISIBILITY CONDITIONS

BACKGROUND

For aircraft safety during landings and takeoff, visibility conditions at airports are monitored and guidelines regarding landings and takeoffs during low visibility conditions (LVC) have been set. Most airports equipped for precision approaches are category (CAT) I. LVC including low Runway Visual Range (RVR) and ceiling at destination airports significantly contribute to flight delays, diversions and flight cancellations therein affecting airport accessibility. Satellite based navigation systems, such as the satellite based augmentation system (SBAS), are currently only approved to provide approach service guidance down to 200 ft which corresponds to CAT I. For lower heights, pilots can only continue approach below published minimums when having approach lights or runway references in sight. Airport ground equipment can be implemented enabling CAT II and CAT III operation during LVC (providing approach service guidance to lower heights than 200 ft). However, airport ground equipment is costly and are usually only installed at larger airports. With small and medium size airports becoming used more and more by both regular and charter aircraft, another type of system is needed to allow navigation below any localizer performance with vertical guidance (LPV) or CAT I that is less expensive but still effective to help prevent delays, diversions and flight cancelations.

SUMMARY

The following summary is made by way of example and not by way of limitation. It is merely provided to aid the reader in understanding some of the aspects of the subject matter described. Embodiments provide airborne navigation integrity monitoring that builds on the navigation solutions of satellite based augmentation systems with LPV guidance and adds an independent onboard supplemental navigation sensor to increase accessibility at CAT I airports in LVC.

In one embodiment, a method of supplementing a satellite based system approach during low visibility conditions is provided. The method includes acquiring satellite range measurements; acquiring additional measurements from at least one additional onboard independent sensor; assigning core sigma values for satellite range measurements and for each additional measurement from the at least one additional onboard independent sensor; determining a weighted position solution using the acquired satellite range measurements, the acquired additional measurements and the assigned core sigma values; applying at least one discriminator that utilizes vehicle positions derived from the acquired satellite range measurements and from the additional measurements from the at least one additional onboard independent sensor to determine if a fault is affecting the weighted positon solution; and generating an alert if an output of the discriminator is outside a set tolerance value needed for low visibility operation.

In another example embodiment, a supplemental system for a satellite based approach during low visibility conditions is provided. The system includes at least one receiver configured to acquire satellite signals, at least one additional sensor, at least one navigation processor and a vehicle control. The at least one navigation processor is in communication with the at least one receiver and the at least one additional sensor. The at least one navigation processor is configured to determine range measurements from the acquired satellite signals and additional measurements from the at least one additional sensor. The at least one navigation processor is further configured to assign core sigma values to the range measurements and to the additional measurements. The at least one navigation processor is further configured to determine a weighted position solution based on the range measurements, the additional measurements and associated core sigma values. The at least one navigation processor is further configured to apply at least one discriminator to detect if a fault is affecting the determined weighted position solution. The vehicle control is in communication with the at least one navigation processor. The vehicle control is configured to control operations of a vehicle based at least in part on the determined weighted position solution when a fault is not affecting the weighted position solution.

In yet another embodiment, a supplemental system for a satellite based approach during low visibility conditions is provided. The system includes a receiving portion of a satellite based navigation system, at least one additional onboard navigation sensor, at least one navigation processor and a vehicle control. The at least one navigation processor is coupled to receive satellite signals from differentially corrected satellite range measurements and additional signals from the at least one additional onboard independent navigation sensor. The at least one navigation processor is configured to determine range measurements from the satellite signals and additional measurements from the additional signals. The at least one navigation processor is further configured to assign core sigma values to associated range measurements from the satellite signals and additional measurements from the additional signals. The at least one navigation processor is further configured to determine a weighted position solution based on the associated range measurement and the additional measurements and the assigned core sigma values. The at least one navigation processor is further configured to apply at least one discriminator to detect if a fault is affecting the determined weighted position solution. The vehicle control is in communication with the at least one navigation processor. The vehicle control configured to control operations of a vehicle based at least in part on the determined weighted position solution when a fault is not detected in the determined weighted position solution.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide airborne navigation integrity monitoring that build on navigation solutions provided by satellite based global positioning augmentation systems (SBAS) for a primary navigation source with an independent onboard supplemental navigation sensor to increase accessibility at CAT I airports in low visibility conditions (LVC). An example of a satellite based augmentation systems (SBAS) used in some embodiments is the wide area augmentation system (WAAS) that provides localizer performance with vertical guidance (LPV) approach. Another example is the European Geostationary Navigation Overlay Service EGNOS. The SBAS is supplemented with an additional navigation sensor (ANS). LPV250 and LPV200 approach service is a widely available approach type at CAT I airfields when the ceiling is at or above 250 or 200 feet. The ANS is used to allow approach below the LPV250 or LPV200 without requiring costly airport ground infrastructure compared to ground based navigation system installations such as ILS and GBAS. Hence, embodiments provide improvements in allowing LVC approaches below LPV 250 or LPV200 without having to use costly airport ground equipment.

Figure 1:
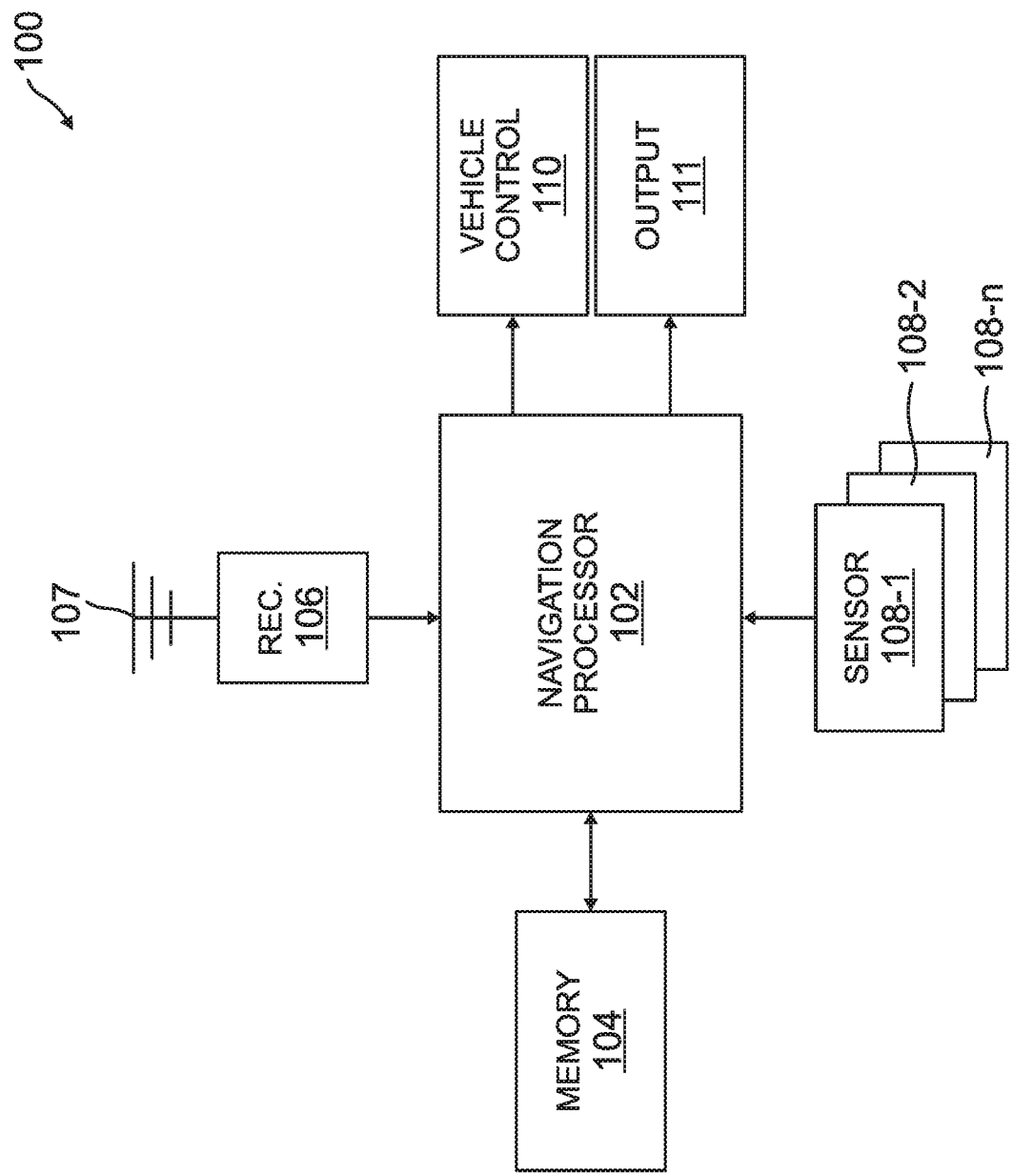
FIG. 1 illustrates a block diagram of a supplemental system for a satellite based approach during low visibility conditions according to one exemplary embodiment.

FIG. 1 illustrates an example block diagram of a supplemental system for a satellite based approach during low visibility conditions 100 of an embodiment. The system includes a navigation processor 102 that is in communication with a memory 104. The navigation processor 102 implements operating instructions stored in the memory 104 in implementing navigation functions. In general, the navigation processor 102 may include any one or more of a processor, microprocessor, a digital signal processor (DSP), an application specific integrated circuit (ASIC), a field program gate array (FPGA), or equivalent discrete or integrated logic circuitry. In some example embodiments, navigation processor 102 may include multiple components, such as any combination of one or more microprocessors, one or more controllers, one or more DSPs, one or more ASICs, one or more FPGAs, as well as other discrete or integrated logic circuitry. The functions attributed to the navigation processor 102 herein may be embodied as software, firmware, hardware or any combination thereof. The navigation processor 102 may be part of a system controller such as a flight management system (FMS) or another type of controller. The memory 104 may include computer-readable operating instructions that, when executed by the navigation processor provides functions of the low visibility approach service system. Such functions may include the functions of aiding in navigation in LVC below LPV200 as described below. The computer readable instructions may be encoded within the memory. Memory 104 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

FIG. 1, further includes a vehicle control 110 that is in communication with navigation processor 102 that is used to control operations of the vehicle such as directional systems of the vehicle. The vehicle control 110 may also be part of an FMS. Also illustrated in an embodiment, is a communication output 111. The output 111 may be a display such as, but not limited to a navigation display or a multifunction display and the like. The output displays outputs of the navigation processor which may include position information, alarms, fault detections and the like.

The low visibility approach service system 100 of FIG. 1 implements a SBAS in one example embodiment. An SBAS is an augmentation of a global navigation satellite system (GNSS) that is used to improve accuracy, reliability and availability of satellite range measurements determined based on satellite signals from the GNSS. Examples of an SBAS as discussed above include WAAS and EGNOS.

The low visibility approach service system 100 of FIG. 1 in this example embodiment includes an antenna that is used to receive satellite signals from a plurality of satellites augmented by the SBAS. In the example, of the FIG. 1, a receiver 106 is associated with the antenna 107. In other embodiments multiple antennas and receivers may be uses (for redundancy). The receiver 106 is in communication with the navigation processor 102. The navigation processor 102 acquires (determines) satellite range measurements for satellite signals received by the antenna 107.

In embodiments, information from one or more additional sensors 108-1 through 108-n, that are available for use with the aircraft, are used to obtain additional position related measurements. The additional sensors can generally be referenced by 108. Any type of sensor 108 may be used that gathers measurements that can be used to determine position. Examples of sensors 108 that may be used include, but are not limited to, radar sensors, infrared sensors, etc. The radar sensors may include weather radar based sensors that are adapted to gather measurements that can be used to determine position. Information gathered by this additional sensor(s) 108 is used by the navigation processor 102 to generate additional measurements. These additional measurements along with the range measurements acquired from the GNSS augmented by SBAS are used in an embodiment, to provide a supplemental navigation solution with integrity monitoring when on SBAS approach, that allows lowering the LPV250 and LPV200 decision height. This will result in a decreased go-around rate and lower number of diversions in bad meteorological conditions.

Figure 2:
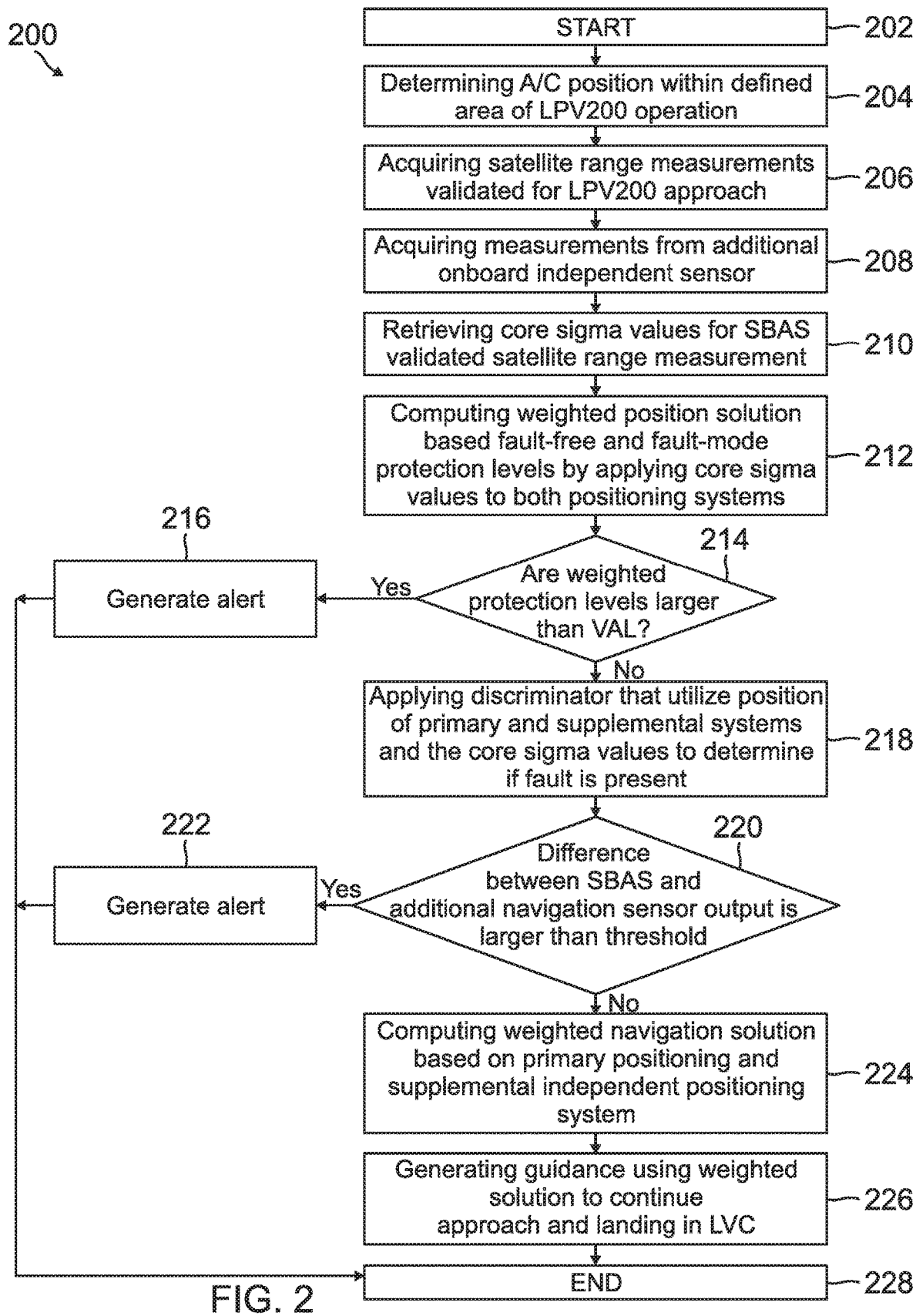
FIG. 2 illustrates a supplementing satellite based augmentation approach during low viability condition flow diagram according to one exemplary embodiment.

A supplemental navigation solution during low visibility condition flow diagram 200 of one example embodiment is illustrated in FIG. 2. The flow diagram 200 is provided as series of steps used in an embodiment. Although, steps are provided in a sequential order in FIG. 1, the steps may be in a different sequential order in other embodiments. Hence, embodiments are not limited to the sequence in which the steps occur in FIG. 2.

The diagram starts at step (202). The process then continues at step (204) where the position of the aircraft within a defined area of LPV250 or LPV200 operation is determined. At some point after the aircraft is within a defined area of LPV250 or LPV200 the process of supplementing the SBAS approach is implemented. Once, the aircraft is within the defined area of LPV250 or LPV200, satellite range measurements validated for of LPV250 or LPV200 approach is acquired at step (206). This is done by processing satellite signals received via the at least one antenna 107 with the navigation processor 102. At step (208), measurements from an additional onboard independent sensor(s) is acquired. The additional measurements are acquired by receiving sensor information via the sensor 108 and processing the sensor information via the navigation processor 102. Hence, two systems are used to gather measurements at the same time.

Once the satellite range measurements have been acquired and the additional measurements have been acquired, core sigma values are assigned to each SBAS validated satellite range measurement and each additional measurement from the sensors at step (210). Core sigma values are standard deviations related to the SBAS range measurements and the additional sensor measurements. Standard deviation is a statistic quantity that measures a dispersion of a data relative to a mean of a determined measurement. It is calculated as a square root of a statistical variance (or dispersion) relative to the mean.

Figure 3:
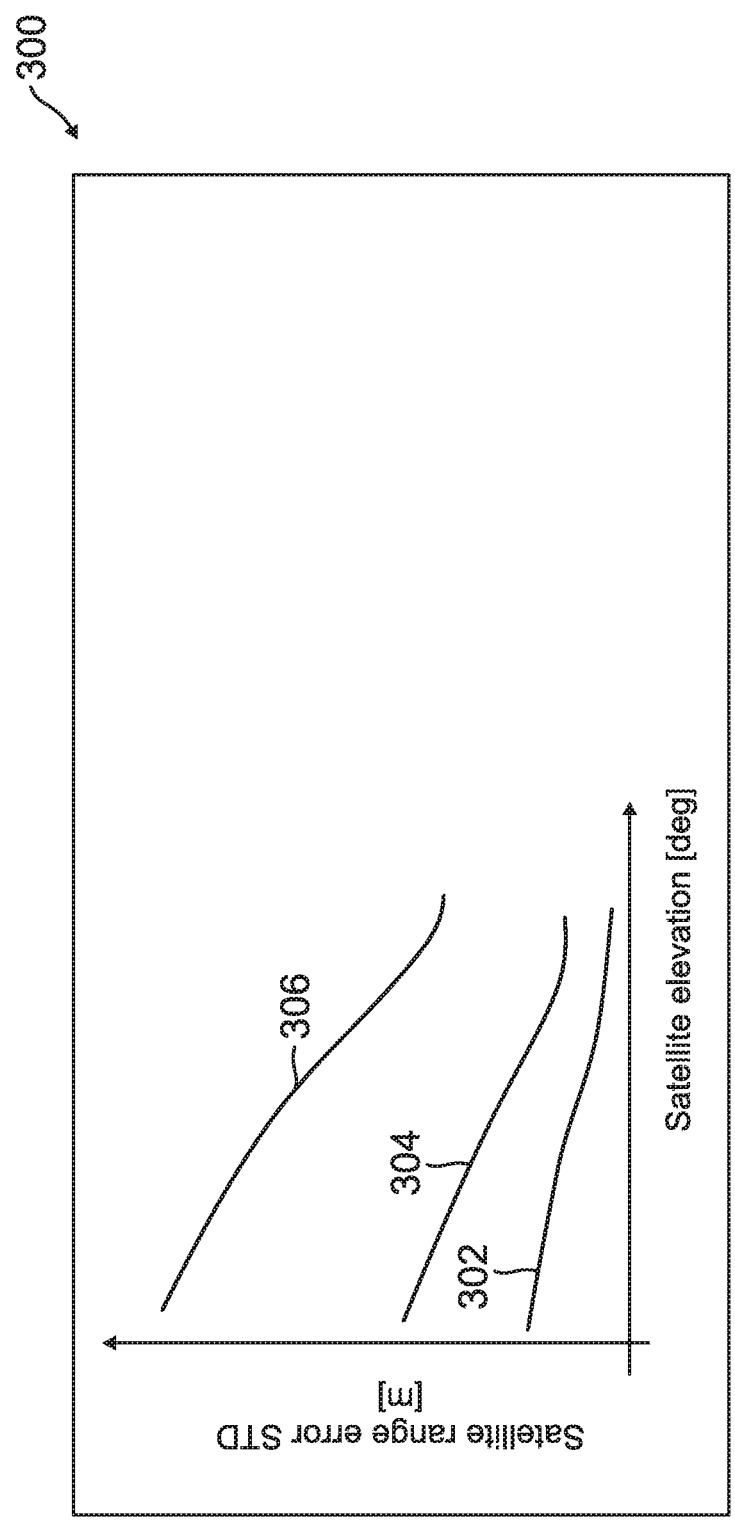
FIG. 3 illustrates a core sigma graph according to one exemplary embodiment.

Referring to FIG. 3, a core sigma graph 300 is illustrated. The core sigma flow diagram plots core sigma values before inflation 302, core sigma values after inflation 304 and over-bounding core sigma values 306. The core sigma graph 300 illustrates the core sigma values relating to SBAS range measurements where the satellite range measurement error standard deviation in meters is plotted versus satellite elevation (degree) values. The core sigma values before inflation 302 is the standard deviation of SBAS range measurement error based on the system observation, or if not available based on system simulation data. The supplemental sensor measurements would have a similar standard deviation plot.

The core sigma after inflation values 304 is the standard deviation of the SBAS range measurement error that bounds all errors with a Gaussian distribution down to $1 \times 10^{-5}$ probability. Core sigmas are obtained based on measured data of the SBAS precision approach service and the additional independent sensor 108. The concept of a core sigma copes with conservative over-bounding provided by a single SBAS and is used when combing SBAS measurements with the supplemental sensor measurements and the additional monitoring on board the aircraft. Embodiments do not need to consider dual system faults (SBAS and supplemental sensors) that can occur with a $10^{-10}$ probability or lower. Overabounding sigma 306 is the standard deviation of the SBAS range measurement errors (with SBAS correction is applied) as provided by the SBAS service and should ensure over-bounding of the SBAS range errors down to $1 \times 10^{-7}$ probability for LPV200 operation.

Referring back to the supplementing satellite based augmentation approach during low viability condition flow diagram 200 of FIG. 2, once the core sigma values are retrieved (or assigned) at step (210), a weighted position solution is computed at step (212) in an embodiment. The fault free and fault mode protection levels are computed for the weighted position solutions by applying core sigma values to both the SBAS and the supplement sensor measurements. Further in an embodiment, a discriminator is applied to detect errors in the satellite measurements or additional sensors as described further below.

Examples of SBAS and additional onboard independent navigation sensor, weighted average computation, weighted vertical protection levels in vertical domain and integrity monitor discriminator are discussed below.

A linear unbiased estimator of aircraft height $\hat{H}_{W,i}$ is the weighted average computed according to:

$$\hat{H}_{W,i} = w_{S,i} \times H_{S,i} + w_{A,i} \times H_{A,i}$$

Where S represents the SBAS, A represents the additional navigation sensor, w represents the weight and H represent height. This is a minimum variance estimator, where greater weight is given to values coming from narrower distribution and S and A weights are defined as follows:

$$w_{S,i} = \frac{\sigma_{A,i}^2}{\sigma_{S,i}^2 + \sigma_{A,i}^2}, \quad w_{A,i} = \frac{\sigma_{S,i}^2}{\sigma_{A,i}^2 + \sigma_{S,i}^2}$$

Where $\sigma_A$ represents the core sigma associated with the height based on the additional sensor measurements and $\sigma_S$ represents the core sigma associated with range measurements from the SBAS and i is the time index.

If we describe both estimations by individual components:

$$H_{A,i} = h + \eta_{A,i} + e_{A,i}$$

$$H_{S,i} = h + \eta_{S,i} + e_{S,i}$$

Where $\eta_{A,i}$, $\eta_{S,i}$ are random components of height estimates in every sample i with sigma's $\sigma_{S,i}$ and $\sigma_{A,i}$, h is aircraft true height and $e_{S,i}$ is the error due to a fault propagated into SBAS vertical position only present in the fault mode. The following formula describes weighted height estimate:

$$\hat{H}_{W,i} = w_{S,i} \cdot h + w_{S,i} \cdot \eta_{S,i} + w_{S,i} \cdot e_{S,i} + w_{A,i} \cdot h + w_{A,i} \cdot \eta_{A,i} + w_{A,i} \cdot e_{A,i}$$

A weighted minimum variance of weighted average expression is as follows:

$$\sigma_W^2 = \frac{1}{\frac{1}{\sigma_S^2} + \frac{1}{\sigma_A^2}} = \frac{\sigma_S^2 \times \sigma_A^2}{\sigma_A^2 + \sigma_S^2}$$

A weighted position solution based vertical fault-free protection level with a hypothesis $H_{(0)}$ of fault-free solution can be expressed as follows:

$$VPL_{W,H(0)} = K_{ffmd} + \sigma_W$$

$$K_{ffmd} = Q^{-1}(\frac{1}{2} P_{H(0)})$$

Referring back to flow diagram 200 of FIG. 2, once the weighted position solution is determined in step (212) it is determined if the weighted protection levels are larger than the vertical alert limit (VAL) at step 214. The total probability of having a fault in the navigation system where the fault causes an error larger than 10 meters and is not detected together with fault-free conditions is less than $10^{-7}$ in an example. For the purposes of airworthiness certification it is desired the largest errors that can occur and be undetected has a probability less than $10^{-7}$. For some system fault modes some embodiments seek to achieve a $1 \times 10^{-9}$ final integrity risk allotment per fault mode in the case of SBAS and ANS weighted solutions used for navigation. In some embodiments, an alert is generated and displayed when any determined protection level is higher than an alert limit. Further in some embodiments, the alert limit relates to vertical and/or lateral alert limits.

The probability in absence of system faults that results in vertical navigation system error (VNSE) greater than 10 m has to be at least lower or equal to the integrity risk allocated to nominal operational $IR_{NOM}$ as indicated in the following equation:

$$P(|VNSE|>VAL|P_{NomOP}) \leq IR_{NOM}$$

Moreover, the probability of a single system fault being undetected resulting in vertical navigation error (VNSE) greater than 10 m has to be at least lower or equal to integrity risk allocated to fault mode IRFAuur as indicated in following equation:

$$P(|VNSE|>VAL|P_{FAULT,i}) \cdot P_{FAULT,i} \leq IR_{FAULT}$$

In current augmentation systems, integrity risk is usually partially allocated to protection level error bounds according to a ground segment design. Protection levels are used to assess navigation system error bound in real time with allocated integrity risk probabilities. In nominal cases they are computed as confidence limit of Gaussian distribution standard deviation in vertical domain. Currently SBAS sends only information to the user to compute protection levels for LPV 200 approach operations. The user protection level should bound both the nominal and faulted conditions to allow aircraft on LPV 200 approach to continue in instrument flight bellow LPV minimums. Two hypotheses of navigation system operational state are defined as follows:
 a) $H_0$—null hypothesis of the system fault-free mode operation
 b) $H_A$—alternative hypothesis of system single fault mode operation Two faults occurring at the same time in both systems is considered to be negligible i.e. less than a probability of $1 \times 10^{-10}$.

The fault-free missed detection multiplier $K_{ffmd}$ is a scalar factor computed according to:

$$K_{ffmd} = Q^{-1}(\frac{1}{2} P_{H(0)})$$

$K_{ffmd}$ is the inverse of the complement of the one-sided standard normal cumulative distribution function. Function $Q(x)$ is defined as right side cumulative distribution function of a normalized Gaussian.

$$Q(x) = \frac{1}{\sqrt{2\pi}} \int_{t=x}^{\infty} e^{-\frac{t^2}{2}} dt$$

Maximum value of one sigma fault-free navigation system error $\sigma_{ff}$ for any of the proposed solutions is given by:

$$\sigma_{ff} = \frac{VAL}{K_{ffmd}}$$

The fault mode protection level provide protection in the case of hypothesis $H_A$ of the SBAS navigation solution single fault onset while being undetected by the additional navigation sensor system monitor which is a conditional probability problem and can be expressed as follows:

$$VPL_{H(A)} = K_{md} \cdot \sigma_A + T$$

$$K_{md} = Q^{-1}(P_{H(A)})$$

Fault mode protection levels protect when the monitor doesn't detect a fault. Under an alternative hypothesis $H_A$, the probability of an SBAS fault missed detection by the additional sensor system monitor is dependent on the characteristic of the errors that confound the observability of the SBAS fault. The detection threshold T is given by:

$$T = K_{ffd} \cdot \sigma_D$$

It is possible to use $\Delta_i$ instead of T to prove integrity but continuity of the system function would be deteriorated. $\Delta_i$ is calculated as follows:

$$\Delta_i = |H_{S,i} - H_{A,i}|$$

Final setting of the $K_{md}$ will depend on the monitor missed detection probability and integrity risk allocation to the faults. Threshold is dependent on the additional navigation sensor (ANS) and SBAS uncertainty, which might be affected by the satellites geometry.

The fault $e_k$ propagates from the pseudorange for each satellite source k into vertical position solution ($E_v$) according to:

$$E_v = \sum_{k=1}^{N} s_{3,k} e_k$$

At every evaluated epoch, the maximum value of VPL for $H_0$ and $H_A$ must be used to compare against VAL to assess approach operation availability. If:

$$VPL_{max} = \max(VPL_{H(0)}, VPL_{H(A)})$$

Fulfills:

$$VPL_{max} \leq VAL$$

No alert is issued and system is in nominal operation mode. Otherwise, if:

$$VPL_{max} > VAL$$

The system function is interrupted and an alert must be issued.

In the case of zero mean position error distribution, the fault-free $H_0$ protection levels are computed as follows:

$$VPL_{W,H(0)} = K_{ffmd} \sigma_W$$

Where the 95% figure of merit reflecting accuracy of weighted solution is defined by:

$$VFOM_w = 1.96 \cdot \sigma_w$$

The fault mode hypothesis $H_A$ now covers fault occurrence in both navigation systems, so two vertical protection levels need to be computed as follows:

$$VPL_{W,H(A)S} = K_{md,S} \cdot \sigma_A + w_{S,i} \cdot T$$

$$VPL_{W,H(A)A} = K_{md,A} \cdot \sigma_S + w_{A,i} \cdot T$$

$$VPL_{max} = \max(VPL_{H(0)}, VPL_{H(A),i})$$

Initially it is assumed the missed detection probability is the same for all equations. However, it might change as detailed characteristic on ANS are available. Alert is issued, if condition $VPL_{max} > VAL$ is true, otherwise normal operation is true. The prior probability of SBAS and ANS faults may be different, so their probabilities of fault missed detection may also be different.

If it is determined at step (214) that the weighted protection levels are larger than VAL, an alarm is generated at step (216) and the process ends at step (228). The alarm may be conveyed to either the output 111, the vehicle control 110 or both.

If it is determined a step (214) that the weighted protection levels are not larger than the VAL, a discriminator is applied that utilizes position measurements from the primary and supplemental system and core sigma values to determine if a fault is present at step (218).

The primary function of the discriminator is to compute an absolute value of the difference between $H_{S,i}$ and $H_{A,i}$ in every sample i and compare it against the detection threshold. The discriminator must detect and alert a user of any rare-normal or faulty events that can cause position failure to occur. The detection threshold T for the test statistic is set to keep probability of an undetected fault sufficiently low while staying within continuity requirement. The residual error of the discriminator output difference is characterized by the noise statistic, standard deviation $\sigma_D$, computed as a root sum square of the standard deviations of the individual navigation sources.

$$\sigma_D = \sqrt{\sigma_S^2 + \sigma_A^2}$$

Fault-free detection probability is fulfilled when the threshold (T) is set according to the following equation:

$$T = K_{ffd} \sigma_D$$

The following equation is used to derive the fault-free detection multiplier.

$$K_{ffd} = Q^{-1}(\tfrac{1}{2} P_{ffd})$$

For example a probability of fault-free detection of $4 \times 1^{-6}$ for all faults would be used to derive a $K_{ffd}$ equal to 4.6. The approach is only available and can continue when the test statistics of absolute value of height difference $\Delta_i$ computed by a discriminator is lower than the detection threshold, otherwise a continuity event occurred. The setting of the threshold based on the noise level statistics determines the likelihood that the monitor detects a fault. A tighter monitor threshold leads to higher sensitivity and a lower probability of fault missed detection. In the monitor evaluation, $P_{md}$ will be computed by integrating the probability that the noisy monitor statistic is below the threshold while fault introducing bias in the measurement is present. Different $P_{md}$ values are expected to be associated with each fault condition. The false detection leads to interruption of system function during intended approach segment.

$$\Delta_i = |H_{S,i} - H_{A,i}|$$

If an output value of the discriminator fulfills $\Delta_i \leq T$ no alert is issued, otherwise, when $\Delta_i > T$ is true, an alert must be issued. As discussed above, if in step (220), the difference between the SBAS and ANS output is larger than a set threshold, an alarm is generated at step (222) and the process ends at step (228). The alarm may be provided to the output 111 and/or the vehicle control 110 in some embodiments. If, however, is it is determined at step (220) the difference between the SBAS and ANS output is not larger than a set threshold, a weighted navigation solution based on the primary positioning and the supplemental independent positioning systems is determined at step (224). Guidance using the weighted solution to continue approach and landing in LVC is generated at step (226). The guidance is provided to the vehicle control 110, in one embodiment, to be used at least in part in aiding operational control of the aircraft during landing.

Figure 4:
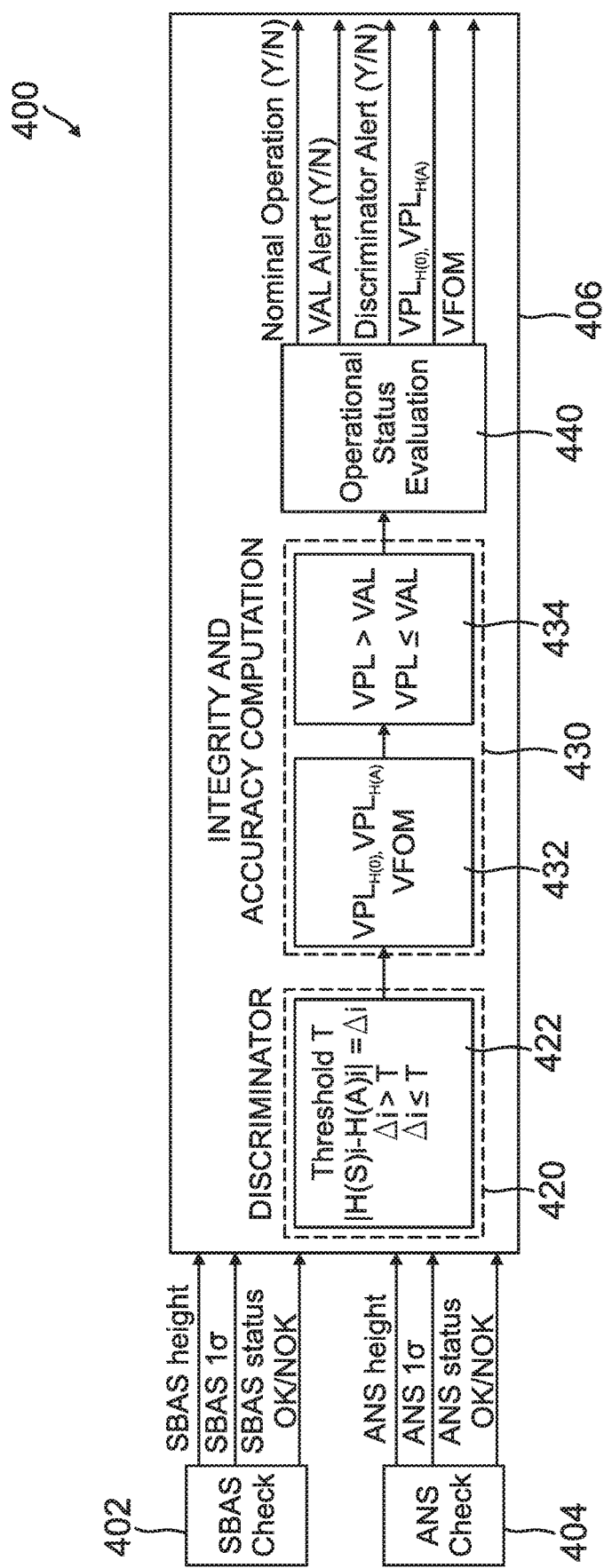
FIG. 4 illustrates a block diagram of a supplemented satellite based augmentation system approach during low visibility system according to one exemplary embodiment.

FIG. 4 illustrates a block diagram of a supplemented satellite based augmentation approach during low visibility system 400 that illustrates inputs, outputs and a functional overview. The system 400 includes an SBAS check 402 and an ANS check 404. The SBAS check includes functions that generate and output the SBAS height, the SBAS core sigma value and an SBAS status. The ANS check includes functions that generate and output the ANS height, the ANS core sigma value and an ANS status. The outputs of the SBAS check 402 and the ANS check 404 are provided to processing block 406. Processing block 406 includes a discriminator function 420, an integrity and accuracy computation function 430 and an operational status evaluation function 440. The discriminator 422 applies a set threshold as discussed above to a determined difference between the SBAS height and the ANS height.

The integrity and accuracy computation function 430 of FIG. 4 includes a vertical figure of merit (VFOM) function for predicted accuracy. The integrity and accuracy computation function 430 determines the vertical protection levels (VPL) for the SBAS and ANS as discussed above. The VPL are compared with a VAL threshold at a VAL threshold function 434. An operation status evaluation function 440 that is coupled to an output of the integrity and accuracy computation function 430 coupled with discriminator function 420, outputs signals that indicate at least one of a normal operation (Y/N), a VAL Alert (Y/N), a discriminator alert (Y/N), $VPL_{H(0)}$ $VPL_{H(A)}$ and VFOM that are used in the operation of the aircraft.

Embodiments of LPV200 and LPV250 may be augmented with other types of augmentation (than SBAS augmentation) or non-augmented GNSS service that allows support for LPV250, LPV200 or Cat I operation.

EXAMPLE EMBODIMENTS

Example 1 is a method of supplementing a satellite based system approach during low visibility conditions. The method includes acquiring satellite range measurements; acquiring additional measurements from at least one additional onboard independent sensor; assigning core sigma values for satellite range measurements and for each additional measurement from the at least one additional onboard independent sensor; determining a weighted position solution using the acquired satellite range measurements, the acquired additional measurements and the assigned core sigma values; applying at least one discriminator that utilizes vehicle positions derived from the acquired satellite range measurements and from the additional measurements from the at least one additional onboard independent sensor to determine if a fault is affecting the weighted positon solution; and generating an alert if an output of the discriminator is outside a set tolerance value needed for low visibility operation.

Example 2, includes the method of Example 1, further including generating guidance instructions for an approach using the weighted position solution.

Example 3 includes the method of any of the Examples 1-2, further including, implementing the guidance instructions in navigating the vehicle.

Example 4 includes the method of Example 2, further including determining fault-free and fault-mode protection levels by applying the core sigma values.

Example 5 includes the method of Examples 4, further including comparing the protection levels against alert limits; and generating an alert when any of the protection levels are higher than the alert limits.

Example 6 includes the method of any of the Examples 1-5, further including displaying at least one of fault detections determined by the discriminator and protection levels.

Example 7 includes the method of any of the Examples 1-6, wherein the at least one additional on board independent sensor is at least one of a forward looking sensor and other independent sensor to determine aircraft position.

Example 8 includes the method of any of the Examples 1-7, wherein the at least one additional on board sensor is part of at least one of a radar system radar sensors and an infrared sensors.

Example 9 includes a supplemental system for a satellite based approach during low visibility conditions. The system includes at least one receiver configured to acquire satellite signals, at least one additional sensor, at least one navigation processor and a vehicle control. The at least one navigation processor is in communication with the at least one receiver and the at least one additional sensor. The at least one navigation processor is configured to determine range measurements from the acquired satellite signals and additional measurements from the at least one additional sensor. The at least one navigation processor is further configured to assign core sigma values to the range measurements and to the additional measurements. The at least one navigation processor is further configured to determine a weighted position solution based on the range measurements, the additional measurements and associated core sigma values. The at least one navigation processor is further configured to apply at least one discriminator to detect if a fault is affecting the determined weighted position solution. The vehicle control is in communication with the at least one navigation processor. The vehicle control is configured to control operations of a vehicle based at least in part on the determined weighted position solution when a fault is not affecting the weighted position solution.

Example 10 includes the system of Example 9, wherein the at least one navigation processor is configured to generate an alarm signal if the discriminator detects a fault affecting the determined weighted position.

Example 11 includes the system of any of the Examples 9-10, wherein the at least one navigation processor is further configured to determine fault-free and fault-mode protection levels by applying the core sigma values.

Example 12 includes the system of any of the Examples 9-11, a display output to convey at least one of a detection of the fault and a determined protection levels.

Example 13 includes the system of any of the Examples 9-12, wherein the at least one navigation processor is further configured to compare the protection levels against alert limits and generate an alert when any of the protection levels are higher than the alert limits.

Example 14 includes the system of any of the Examples 10-13, further including at least one antenna coupled to the at least one receiver to acquire satellite signals.

Example 15 includes the system of any of the Examples 10-14, wherein the at least one receiver is part of a satellite based augmentation system and the at least one additional sensor is at least one of a radar sensor and an infrared radar sensor.

Example 16 includes the system of any of the Examples 10-15, wherein the at least one navigation processor is configured to determine the fault detection by comparing a position derived from a satellite measurement with a position derived from an additional measurement of the additional measurements from the at least one additional sensor.

Example 17 is a supplemental system for a satellite based approach during low visibility conditions. The system includes a receiving portion of a satellite based navigation system, at least one additional onboard navigation sensor, at least one navigation processor and a vehicle control. The at least one navigation processor is coupled to receive satellite signals from differentially corrected satellite range measurements and additional signals from the at least one additional onboard independent navigation sensor. The at least one navigation processor is configured to determine range measurements from the satellite signals and additional measurements from the additional signals. The at least one navigation processor is further configured to assign core sigma values to associated range measurements from the satellite signals and additional measurements from the additional signals. The at least one navigation processor is further configured to determine a weighted position solution based on the associated range measurement and the additional measurements and the assigned core sigma values. The at least one navigation processor is further configured to apply at least one discriminator to detect if a fault is affecting the determined weighted position solution. The vehicle control is in communication with the at least one navigation processor. The vehicle control configured to control operations of a vehicle based at least in part on the determined weighted position solution when a fault is not detected in the determined weighted position solution.

Example 18 includes the system of Example 17, wherein the at least one navigation processor is further configured to determine fault-free and fault-mode protection levels by applying the core sigma values and to compare the protection levels against alert limits and generate an alert when any of the protection levels are higher than the alert limits.

Example 19 includes the system of any of the Examples 17-18, wherein the at least one navigation processor is configured to generate an alarm signal when at least one of an output of the discriminator detects a fault is affecting determined weighted position.

Example 20 includes the system of any of the Examples 17-19, wherein the receiving portion of the satellite based navigation system further includes at least one antenna and at least one receiver in communication with the at least one antenna.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of supplementing a satellite based system approach during low visibility conditions, the method comprising:
    acquiring satellite range measurements;
    acquiring additional measurements from at least one additional onboard independent sensor;
    assigning core sigma values for satellite range measurements and for each additional measurement from the at least one additional onboard independent sensor;
    determining a weighted position solution using the acquired satellite range measurements, the acquired additional measurements and the assigned core sigma values;
    applying at least one discriminator that utilizes vehicle positions derived from the acquired satellite range measurements and from the additional measurements from the at least one additional onboard independent sensor to determine if a fault is affecting the weighted position solution;
    generating an alert if an output of the discriminator is outside a set tolerance value needed for low visibility operation and determining fault-free and fault-mode protection levels by applying the core sigma values.

2. The method of claim 1, further comprising:
generating guidance instructions for an approach using the weighted position solution.

3. The method of claim 2, further comprising:
implementing the guidance instructions in navigating the vehicle.

4. The method of claim 1, further comprising:
comparing the protection levels against alert limits; and
generating an alert when any of the protection levels are higher than the alert limits.

5. The method of claim 1, further comprising:
displaying at least alert conditions determined by at least one of fault detections determined by the discriminator and determined protection levels.

6. The method of claim 1, wherein the at least one additional on board independent sensor is at least one of a forward looking sensor and other independent sensor to determine aircraft position.

7. The method of claim 1, wherein the at least one additional on board sensor is part of at least one of a radar system radar sensors and an infrared sensors.

8. A supplemental system for a satellite based approach during low visibility conditions, the system comprising:
at least one receiver configured to acquire satellite signals;
at least one additional sensor;
at least one navigation processor in communication with the at least one receiver and the at least one additional sensor, the at least one navigation processor configured to determine range measurements from the acquired satellite signals and additional measurements from the at least one additional sensor, the at least one navigation processor further configured to assign core sigma values to the range measurements and to the additional measurements, the at least one navigation processor is further configured to determine a weighted position solution based on the range measurements, the additional measurements and associated core sigma values, the at least one navigation processor further configured to apply at least one discriminator to detect if a fault is affecting the determined weighted position solution, wherein the at least one navigation processor is further configured to determine fault-free and fault-mode protection levels by applying the core sigma values; and
a vehicle control in communication with the at least one navigation processor, the vehicle control configured to control operations of a vehicle based at least in part on the determined weighted position solution when a fault is not affecting the weighted position solution.

9. The system of claim 8, wherein the at least one navigation processor is configured to generate an alarm signal if the discriminator detects a fault affecting the determined weighted position.

10. The system of claim 8, further comprising:
a display output to convey at least one of a detection of the fault and a determined protection levels.

11. The system of claim 8, wherein the at least one navigation processor is further configured to compare the protection levels against alert limits and generate an alert when any of the protection levels are higher than the alert limits.

12. The system of claim 8, further comprising:
at least one antenna coupled to the at least one receiver to acquire satellite signals.

13. The system of claim 8, wherein the at least one receiver is part of a satellite based augmentation system and the at least one additional sensor is at least one of a radar sensor and an infrared radar sensor.

14. The system of claim 8, wherein the at least one navigation processor is configured to determine the fault detection by comparing a position derived from a satellite measurement with a position derived from an additional measurement of the additional measurements from the at least one additional sensor.

15. A supplemental system for a satellite based approach during low visibility conditions, the system comprising:
a receiving portion of a satellite based navigation system;
at least one additional onboard navigation sensor;
at least one navigation processor coupled to receive satellite signals from differentially corrected satellite range measurements and additional signals from the at least one additional onboard independent navigation sensor, the at least one navigation processor configured to determine range measurements from the satellite signals and additional measurements from the additional signals, the at least one navigation processor further configured to assign core sigma values to associated range measurements from the satellite signals and additional measurements from the additional signals, the at least one navigation processor is further configured to determine a weighted position solution based on the associated range measurement and the additional measurements and the assigned core sigma values, the at least one navigation processor further configured to apply at least one discriminator to detect if a fault is affecting the determined weighted position solution, wherein the at least one navigation processor is further configured to determine fault-free and fault-mode protection levels by applying the core sigma values and to compare the protection levels against alert limits and generate an alert when any of the protection levels are higher than the alert limits; and
a vehicle control in communication with the at least one navigation processor, the vehicle control configured to control operations of a vehicle based at least in part on the determined weighted position solution when a fault is not detected in the determined weighted position solution.

16. The system of claim 15, wherein the at least one navigation processor is configured to generate an alarm signal when at least one of an output of the discriminator detects a fault is affecting determined weighted position.

17. The system of claim 15, wherein the receiving portion of the satellite based navigation system further comprises:
at least one antenna; and
at least one receiver in communication with the at least one antenna.

* * * * *